(12) United States Patent
Chen et al.

(10) Patent No.: US 8,432,178 B2
(45) Date of Patent: Apr. 30, 2013

(54) TESTING DEVICE AND METHOD THEREOF

(75) Inventors: Xian-Kui Chen, Shenzhen (CN); Hai-Li Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 538 days.

(21) Appl. No.: 12/826,911

(22) Filed: Jun. 30, 2010

(65) Prior Publication Data

US 2011/0279145 A1 Nov. 17, 2011

(30) Foreign Application Priority Data

May 14, 2010 (CN) .......................... 2010 1 0172511

(51) Int. Cl.
*G01R 31/02* (2006.01)
*G01R 31/28* (2006.01)
*G01F 11/00* (2006.01)

(52) U.S. Cl.
USPC .................. 324/762.01; 714/30; 714/715

(58) Field of Classification Search ........... 324/762.01–762.06, 763.01–763.02
See application file for complete search history.

(56) References Cited

U.S. PATENT DOCUMENTS

| | | | |
|---|---|---|---|
| 7,089,451 B2* | 8/2006 | Ote et al. ........................ | 714/31 |
| 7,512,915 B2* | 3/2009 | Anand et al. ................... | 716/136 |
| 7,728,599 B2* | 6/2010 | Tae et al. ....................... | 324/433 |
| 8,134,383 B2* | 3/2012 | Yoshikawa ............... | 324/762.01 |
| 8,145,959 B2* | 3/2012 | Mims et al. .................... | 714/718 |
| 8,327,212 B2* | 12/2012 | Ichimiya et al. .............. | 714/748 |
| 2005/0172176 A1* | 8/2005 | Ortiz et al. ....................... | 714/47 |
| 2006/0267577 A1* | 11/2006 | Erez et al. .................. | 324/158.1 |
| 2007/0113209 A1* | 5/2007 | Park et al. ......................... | 716/4 |
| 2007/0162787 A1* | 7/2007 | Dart et al. ....................... | 714/54 |
| 2007/0174517 A1* | 7/2007 | Robillard et al. ............... | 710/62 |
| 2008/0012583 A1* | 1/2008 | Audet et al. ................... | 324/713 |
| 2009/0006901 A1* | 1/2009 | Brey et al. ....................... | 714/47 |
| 2011/0175639 A1* | 7/2011 | Yoko et al. ............... | 324/762.06 |
| 2011/0231697 A1* | 9/2011 | Berke et al. ....................... | 714/3 |
| 2012/0049881 A1* | 3/2012 | Johnson et al. .......... | 324/762.01 |
| 2013/0024719 A1* | 1/2013 | Zhang .......................... | 714/4.11 |

* cited by examiner

*Primary Examiner* — Joshua Benitez Rosario
(74) *Attorney, Agent, or Firm* — Altis Law Group, Inc.

(57) ABSTRACT

A testing device for testing a board managing controller (BMC) of a computer motherboard including a power supply, a BMC, and a warning unit, includes a storing module, a voltage adjusting module, and a voltage displaying module. The storing module stores a preset warning voltage and an upper limit voltage larger than the preset warning voltage. The voltage adjusting module is used for adjusting the voltage of the power supply. The voltage displaying module is used for displaying the output voltage of the voltage adjusting module. It indicates the BMC works properly if the warning unit provides warning when the output voltage of the voltage adjusting module is less than the preset warning voltage, or the warning unit is silent when the output voltage of the voltage adjusting module falls between the preset warning voltage and the upper limit voltage.

10 Claims, 3 Drawing Sheets

TESTING DEVICE AND METHOD THEREOF

BACKGROUND

1. Technical Field

The present disclosure relates to testing devices and, particularly, to a testing device for testing a board management controller of a computer.

2. Description of Related Art

Currently, computer motherboards employ a board management controller (BMC) for monitoring an output voltage of a power supply of computers and giving warnings when the output voltage of the power supply is larger than an upper limit voltage to avoid damage to the computers. However, the BMC may malfunction and fail to provide a warning about the malfunction which can cause damage to the computer motherboards, without the user being aware.

Therefore, it is desirable to provide a testing device that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
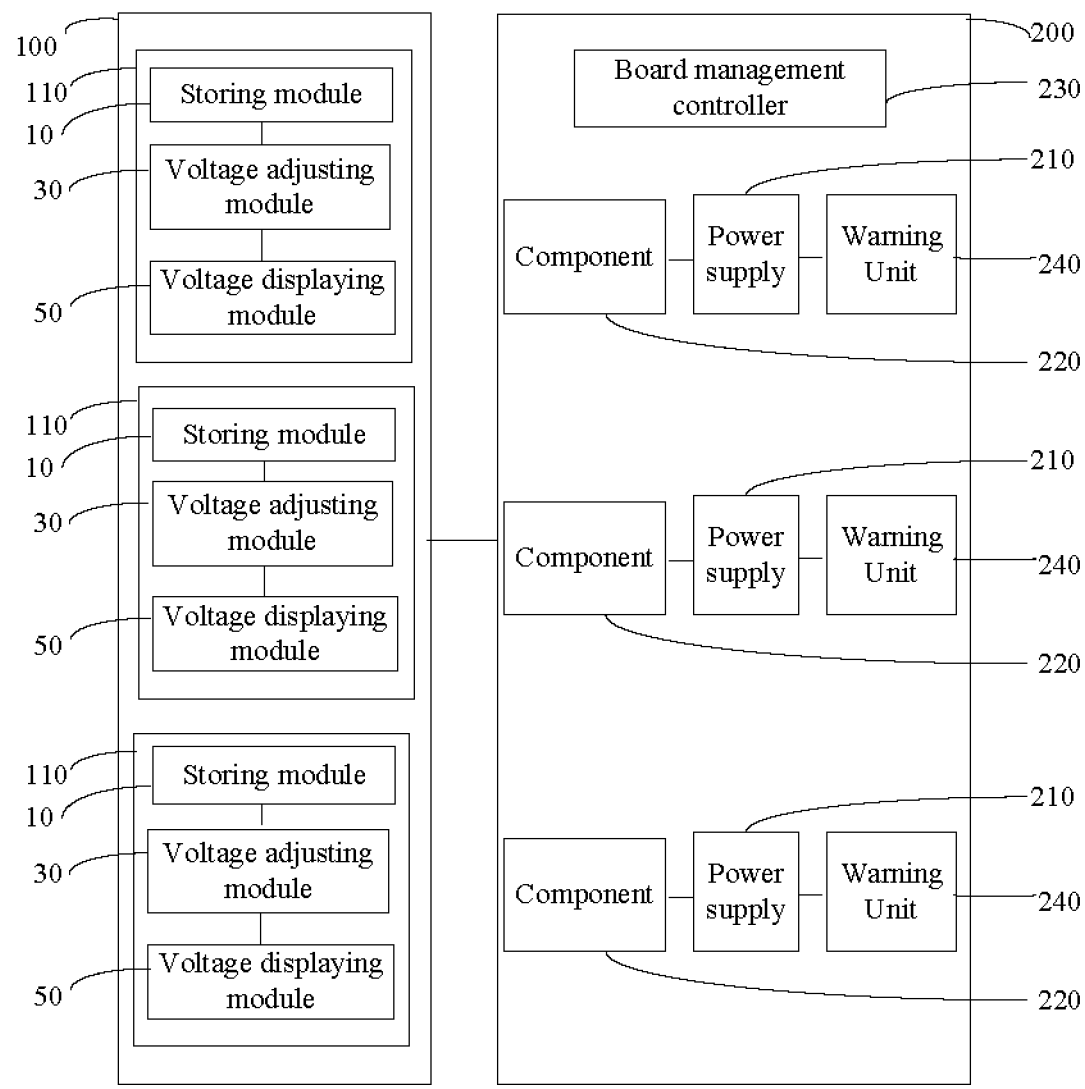
FIG. 1 is a functional block diagram of a testing device, according to one embodiment.
Figure 2:
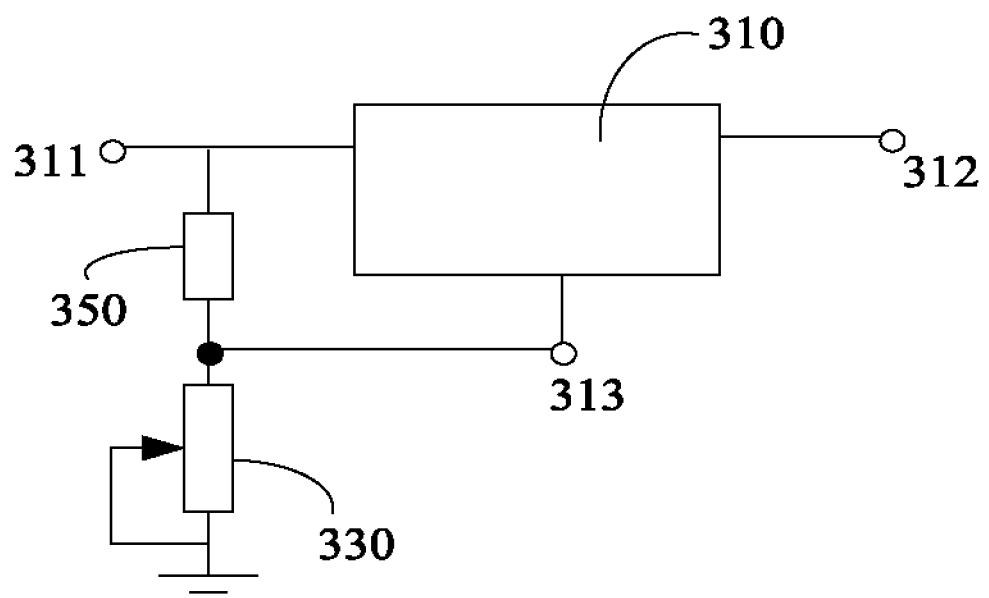
FIG. 2 is a circuit diagram of the testing device of FIG. 1.

Referring to FIGS. 1 and 2, a testing device 100, according to one embodiment, is configured for testing a board management controller (BMC) 230 of a computer motherboard 200. In addition to the BMC 230, the computer motherboard 200 further includes three power supplies 210, three components 220, and three warning units 240. The power supplies 210, the components 220, and the warning units 240 are electronically connected in series. Each power supply 210 is used for powering a corresponding component 220, such as a hard drive or a DVD drive. The BMC 230 monitors whether the power supplies 210 is functioning properly and controls the corresponding warning units 240 to provide warnings when the corresponding power supplies 210 are not working properly. In the present embodiment, the output voltages of the three components 220 are about 3.3V, 5V, 12V, respectively, and the three warning units 240 are a red light emitting diode (LED), a green LED and a blue LED, respectively. It can be understood that the three warning units 240 can also be three different buzzers emitting different sounds. It should be noteworthy that the number of the warning units 240 is not limited to this embodiment. In other alternative embodiments, only one warning unit 240 may be employed to giving a warning for all power supplies 210. The user can determine which power supply is not working properly by reading the log of a basic input/output system (BIOS) of the computer. The numbers of the power supplies 210 and the components 220 are not limited to this embodiment.

The testing device 100 includes three testing systems 110 electronically connected to the corresponding components 220. Each testing system 110 includes a storing module 10, a voltage adjusting module 30, and a voltage displaying module 50. It can be understood that the number of the testing systems is not limited to this embodiment, but can be dependent on the number of the components and the power supplies.

Each storing module 10 stores an upper limit voltage and a preset warning voltage of the corresponding component 220. Each upper limit voltage is larger than the corresponding preset warning voltage. When the output voltage of a power supply 210 falls between the corresponding upper limit voltage and the preset warning voltage, the corresponding component 220 may not work properly, and at high risk of damage. In the present embodiment, the preset warning voltage is about 110% of the rated voltage of the corresponding component 220, and the upper limit voltage is about 115% of the rated voltage of the corresponding component 220.

Referring to FIG. 2, the voltage adjusting module 30 is configured for adjusting the output voltage of the corresponding power supply 210 and includes a voltage adjusting chip 310, a rheostat 330, and a resistor 350. The voltage adjusting chip 310 includes an input pin 311, an output pin 312, and a controlling pin 313. The voltage adjusting module 30 is configured such that the voltage of the output pin 312 is approximately equal to the sum of the voltage of the input pin 311 and the voltage of the controlling pin 313. The input pin 311 is electronically connected to a corresponding power supply 210. The output pin 312 is electronically connected to the BMC 310. The controlling pin 313 is grounded through the rheostat 330. The input pin 311 is connected to the controlling pin 313 through the resistor 350. The voltage of the controlling pin 313 is approximately equal to the voltage of the rheostat 330. Obviously, the voltage of the controlling pin 313 can be changed with the resistance of the rheostat 330. It can be determined that the BMC 230 can work properly if the warning units 240 are silent when the output voltages of the voltage adjusting modules 30 are less than the corresponding preset warning voltages, or the warning units 240 provide warnings when the output voltages of the voltage adjusting modules 30 fall between the corresponding preset warning voltages and the corresponding upper limit voltages respectively by adjusting the resistance of the rheostats 330.

The voltage displaying module 50 is configured for displaying the voltage of the output pin 312 of the voltage adjusting chip 310 and includes an anode (not shown) and a cathode (not shown). The anode is connected to the output pin 312 of the voltage adjusting chip 310. The cathode is grounded. In the present embodiment, the voltage displaying module 50 is a voltmeter.

In use, the three rheostats 330 are adjusted respectively such that the voltages of the output pins 312 is less than the corresponding preset warning voltages. If the warning units 240 provide warnings, it indicates the BMC 230 is working properly. If the warning units 240 do not provide warnings, the three rheostats 330 are adjusted again until the voltages of the output pins 312 fall between the corresponding preset warning voltages and the corresponding upper limit voltages. If the warning units 240 provide warnings, it indicates the BMC 230 works properly. If the warning units 240 do not provide warnings, it indicates the BMC 230 is not working properly.

Figure 3:
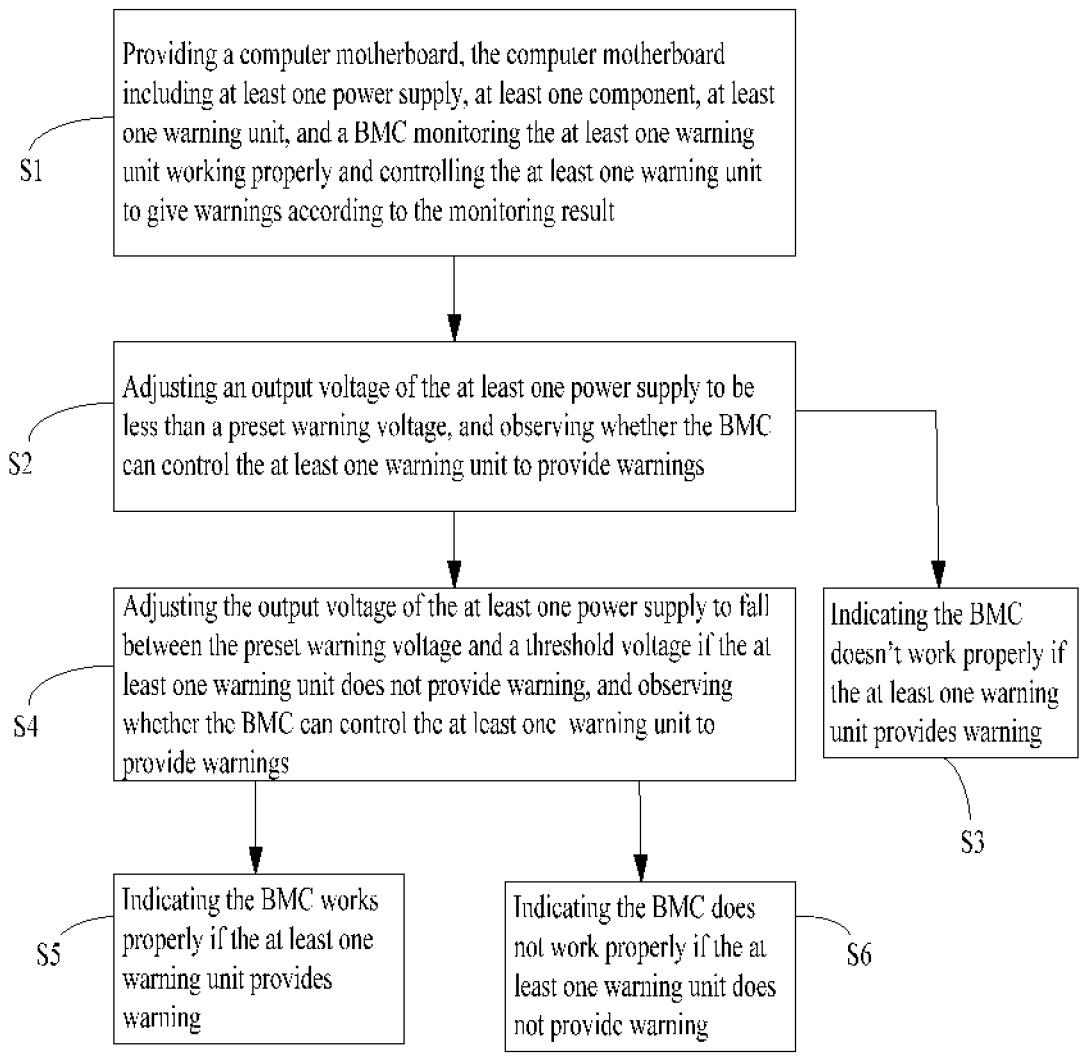
FIG. 3 is a flow chart of one embodiment of a testing method.

Referring to FIG. 3, one embodiment of a testing method of the testing device 100 is shown. Depending on the embodiment, certain of the steps described below may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps. The testing method includes the following steps:

S1: Providing a computer motherboard, the computer motherboard including at least one power supply, at least one component, at least one warning unit, and a BMC monitoring the at least one warning unit working properly and controlling the at least one warning unit to give warnings according to the monitoring result.

S2: adjusting an output voltage of the at least one power supply to be less than a preset warning voltage, and observing whether the BMC can control the at least one warning unit to provide warnings.

S3: indicating the BMC does not work properly if the at least one warning unit provides warning.

S4: adjusting the output voltage of the at least one power supply to fall between the preset warning voltage and a threshold voltage if the at least one warning unit does not provide warning, and observing whether the BMC can control the at least one warning unit to provide warnings.

S5: indicating the BMC works properly if the at least one warning unit provides warning.

S6: indicating the BMC does not work properly if the at least one warning unit does not provide warning.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A testing device configured for testing a board managing controller (BMC) of a computer motherboard comprising at least one power supply, at least one component, a board management controller (BMC), and at least one warning unit, the at least one power supply configured for powering a corresponding component, the BMC configured for monitoring whether the at least one power supply works properly and controlling the at least one warning unit to provide a warning according to the monitoring result, the testing device comprising at least one testing system corresponding to the at least one power supply, the at least one testing system comprising:

a storing module storing a preset warning voltage and an upper limit voltage larger than the preset warning voltage;

a voltage adjusting module adjusting the voltage of the at least one power supply of the computer motherboard; and a voltage displaying module displaying the output voltage of the voltage adjusting module; wherein wherein if the at least one warning unit does not provide warning when an output voltage of the voltage adjusting module is less than the preset warning voltage, or the at least one warning unit provides warning when the output voltage of the voltage adjusting module falls between the preset warning voltage and the upper limit voltage, indicates the BMC is working properly.

2. The testing device in claim 1, wherein the voltage adjusting chip comprises an input pin, an output pin, and a controlling pin; the voltage adjusting module is configured such that the voltage of the output pin is approximately equal to the sum of the voltage of the input pin and the voltage of the controlling pin.

3. The testing device in claim 2, wherein the voltage adjusting module comprises a voltage adjusting chip, a rheostat, and a resistor; the input pin is electronically connected to the at least one power supply, the output pin is electronically connected to the BMC, the controlling pin is grounded through the rheostat, and the input pin is connected to the controlling pin through the resistor.

4. The testing device in claim 1, wherein the preset warning voltage is about 110% of the rated voltage of the corresponding component, the upper limit voltage is about 115% of the rated voltage of the corresponding component.

5. The testing device in claim 1, wherein the voltage of the at least one component is about 3.3V, about 5V, or about 12V.

6. The testing device in claim 1, wherein the voltage displaying module is a voltmeter.

7. The testing device in claim 1, wherein the at least one warning unit is an LED or buzzer.

8. The testing device in claim 1, wherein the at least one warning unit corresponds to the at least one power supply.

9. The testing device in claim 1, wherein the testing device only includes one warning unit, and the at least one power supply not working properly is indicated by a log of a basic input output system (BIOS) of the computer motherboard.

10. A testing method comprising:

providing a computer motherboard comprising at least one component, at least one power supply powering the at least one component, at least one warning unit, and a BMC monitoring whether the power supply works properly and controlling the at least one warning unit to provide a warning according to the monitoring result;

adjusting an output voltage of the at least one power supply to be less than a preset warning voltage, and observing whether the BMC can control the at least one warning unit to provide warning;

indicating the BMC does not work properly if the at least one warning unit provides warning;

adjusting the output voltage of the at least one power supply to fall between the preset warning voltage and a threshold voltage if the at least one warning unit does not provide warning, and observing whether the BMC can control the at least one warning unit to provide warning;

indicating the BMC works properly if the at least one warning unit provides warning;

indicating the BMC does not work properly if the at least one warning unit does not provide warning.

* * * * *